United States Patent
Ohno et al.

(10) Patent No.: US 8,105,544 B2
(45) Date of Patent: Jan. 31, 2012

(54) EXHAUST GAS TREATING APPARATUS

(75) Inventors: Kazushige Ohno, Gifu (JP); Masafumi Kunieda, Gifu (JP); Takahiko Ido, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 410 days.

(21) Appl. No.: 12/534,159

(22) Filed: Aug. 3, 2009

(65) Prior Publication Data

US 2009/0311146 A1    Dec. 17, 2009

Related U.S. Application Data

(63) Continuation of application No. PCT/JP2008/059282, filed on May 20, 2008.

(51) Int. Cl.
*B01D 50/00* (2006.01)
(52) U.S. Cl. .................................... 422/171; 422/180
(58) Field of Classification Search .............. 422/171, 422/177, 180; 502/60
See application file for complete search history.

(56) References Cited

U.S. PATENT DOCUMENTS

| | | | |
|---|---|---|---|
| 5,443,803 A | 8/1995 | Mizuno et al. | |
| 5,516,497 A * | 5/1996 | Speronello et al. | 423/235 |
| 5,780,002 A * | 7/1998 | Miyadera et al. | 423/239.1 |
| 6,133,185 A * | 10/2000 | Kinugasa et al. | 502/67 |
| 7,767,176 B2 * | 8/2010 | Patchett et al. | 423/213.5 |
| 2001/0002988 A1 * | 6/2001 | Noda et al. | 422/180 |
| 2005/0266992 A1 | 12/2005 | Ohno et al. | |
| 2006/0019061 A1 | 1/2006 | Oshimi | |
| 2006/0228283 A1 * | 10/2006 | Malyala et al. | 423/239.1 |
| 2007/0259770 A1 | 11/2007 | Hofmann et al. | |

FOREIGN PATENT DOCUMENTS

| | | |
|---|---|---|
| EP | 0415410 | 3/1991 |
| EP | 1736220 | 12/2006 |
| EP | 2105182 | 9/2009 |
| EP | 2116293 | 11/2009 |
| EP | 2130604 | 12/2009 |
| JP | 05-038452 | 2/1993 |
| JP | 09-103653 | 4/1997 |
| JP | 10-141047 | 5/1998 |
| JP | 11-99335 | 4/1999 |
| JP | 2005-349378 | 12/2005 |
| JP | 2006-326574 | 12/2006 |
| JP | 2007-229700 | 9/2007 |
| WO | 2005079165 | 9/2005 |
| WO | 2006137149 | 12/2006 |
| WO | 2009/103549 | 8/2009 |

* cited by examiner

OTHER PUBLICATIONS

R. Wusirika et al., "Extruded Zeolite Catalysts for Lean Exhaust Application", SAE International, 2005, pp. 1-11, XP-002561687.

*Primary Examiner* — Tom Duong
(74) *Attorney, Agent, or Firm* — Ditthavong Mori & Steiner, P.C.

(57) ABSTRACT

An exhaust gas treating apparatus includes an upstream honeycomb structure and a downstream honeycomb structure each provided along an exhaust gas flowing direction of the exhaust gas treating apparatus. Each of the plurality of honeycomb structures includes at least one honeycomb unit includes zeolite, an inorganic binder, and walls. A first ratio of weight of zeolite ion-exchanged with at least one of Cu, Mn, Ag, and V in the downstream honeycomb structure is greater than a first ratio of weight of zeolite ion-exchanged with at least one of Cu, Mn, Ag, and V in the upstream honeycomb structure. A second ratio of weight of zeolite ion-exchanged with at least one of Fe, Ti, and Co in the upstream honeycomb structure is greater than a second ratio of weight of the zeolite ion-exchanged with at least one of Fe, Ti, and Co in the downstream honeycomb structure.

33 Claims, 4 Drawing Sheets

EXHAUST GAS TREATING APPARATUS

CROSS-REFERENCE TO RELATED APPLICATION

The present application is a continuation application of PCT International Application No. PCT/JP2008/059282, filed on May 20, 2008, the entire contents of which are hereby incorporated herein by reference.

BACKGROUND OF THE INVENTION

1. Field of the Invention

The present invention relates to an exhaust gas treating apparatus.

2. Description of the Related Art

Conventionally, as one of the automotive exhasut gas treating systems, an SCR (selective catalytic reduction) system has been known in which NOx is reduced to nitrogen and water by using ammonia.

In the system, the following chemical reactions are performed.

In addition, as an ammonia absorbing material, zeolite is known in the SCR system.

In JPA H9-103653, a method is disclosed in which NOx is converted into a harmless substance. In the method, Fe-ZSM-5 monolithic structure zeolite is formed in which a mole ratio of silica to alumina is at least approximately 10 and the Fe contained amount is approximately 1 to 5 wt %, and the formed zeolite is configured so as to contact a work-stream containing NOx at approximately at least 200° C.

In WO2006/137149A, a honeycomb structure is disclosed. A honeycomb unit of the honeycomb structure is formed so as to contain inorganic particles and inorganic fibers and/or inorganic whiskers. The inorganic particles are selected from one or more materials of a group of alumina, silica, zirconia, titania, ceria, mullite, and zeolite.

The entire contents of JPA H9-103653 and WO2006/137149A are hereby incorporated by reference.

SUMMARY OF THE INVENTION

According to one aspect of the present invention, an exhaust gas treating apparatus includes a plurality of honeycomb structures including an upstream honeycomb structure and a downstream honeycomb structure each provided along an exhaust gas flowing direction of the exhaust gas treating apparatus. Each of the plurality of honeycomb structures includes at least one honeycomb unit. The at least one honeycomb unit has a longitudinal direction and includes zeolite, an inorganic binder, and walls. The zeolite includes zeolite ion-exchanged with at least one of Cu, Mn, Ag, and V and zeolite ion-exchanged with at least one of Fe, Ti, and Co. The walls extend along the longitudinal direction to define through holes. The exhaust gas treating apparatus has a first ratio of weight of the zeolite ion-exchanged with at least one of Cu, Mn, Ag, and V to a total weight of the zeolite ion-exchanged with at least one of Cu, Mn, Ag, and V and the zeolite ion-exchanged with at least one of Fe, Ti, and Co. The first ratio in the downstream honeycomb structure is greater than the first ratio in the upstream honeycomb structure. The exhaust gas treating apparatus has a second ratio of weight of the zeolite ion-exchanged with at least one of Fe, Ti, and Co to the total weight of the zeolite ion-exchanged with at least one of Cu, Mn, Ag, and V and the zeolite ion-exchanged with at least one of Fe, Ti, and Co. The second ratio in the upstream honeycomb structure is greater than the second ratio in the downstream honeycomb structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A is a cut-away side view of an example of an exhaust gas treating apparatus according to an embodiment of the present invention;

FIG. 1B is a cut-away side view of other example of an exhaust gas treating apparatus according to the embodiment of the present invention;

FIG. 2 is a perspective view of an example of a honeycomb structure which is used in the exhaust gas treating apparatus according to the embodiment of the present invention;

FIG. 3A is a perspective view of other example of a honeycomb structure which is used in the exhaust gas treating apparatus according to the embodiment of the present invention; and FIG. 3B is a perspective view of a honeycomb unit shown in FIG. 3A.

DETAILED DESCRIPTION OF THE PREFERRED EMBODIMENT

Referring to the drawings, a preferred embodiment of the present invention is described.

Figure 1A:
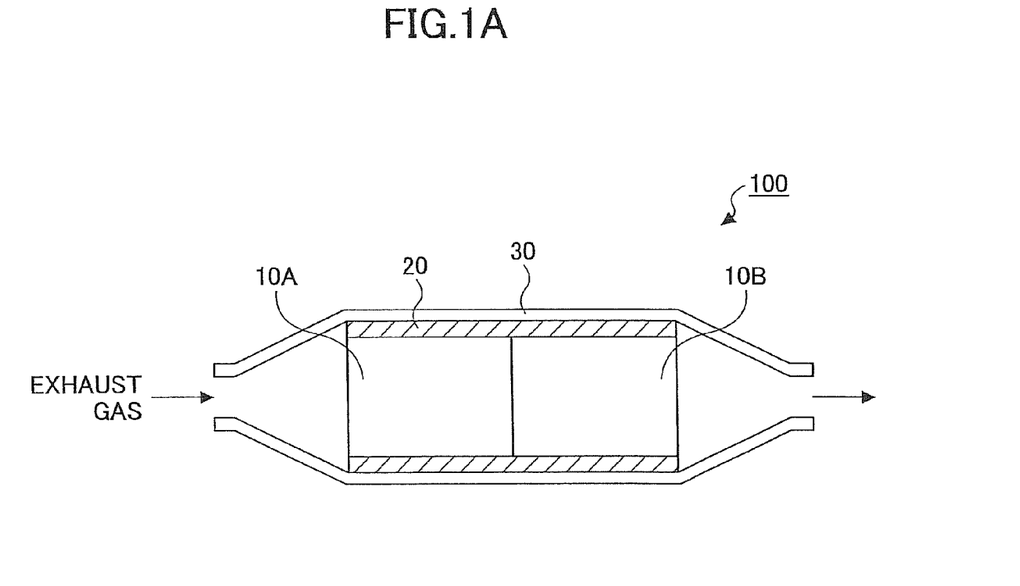

An example of an exhaust gas treating apparatus according to an embodiment of the present invention is shown in FIG. 1A. In an exhaust gas treating apparatus 100 shown in FIG. 1A, honeycomb structures 10A and 10B are disposed at the upstream side and the downstream side in the exhaust gas flowing direction, respectively. Each of the honeycomb structures 10A and 10B includes a honeycomb unit containing zeolite and an inorganic binder in which plural through holes are formed in parallel in the long length direction by being separated with the use of walls. At this time, the honeycomb structures 10A and 10B are contained in a metal casing 30 while a holding sealing member 20 covers peripheral surfaces of the honeycomb structures 10A and 10B.

Further, an ejection unit (not shown) such as ejection nozzles which eject ammonia or a precursor of the ammonia is disposed at the upstream side of the honeycomb structure 10A in the exhaust gas flowing direction. With this, the ammonia is added into the exhaust gases, and NOx contained in the exhaust gases is reduced on zeolite contained in the honeycomb structures 10A and 10B. At this time, when storage stability of the ammonia is considered, urea water is preferably used as the precursor of the ammonia. The urea water is hydrolyzed by being heated in the exhaust gases and the ammonia is generated.

Figure 1B:
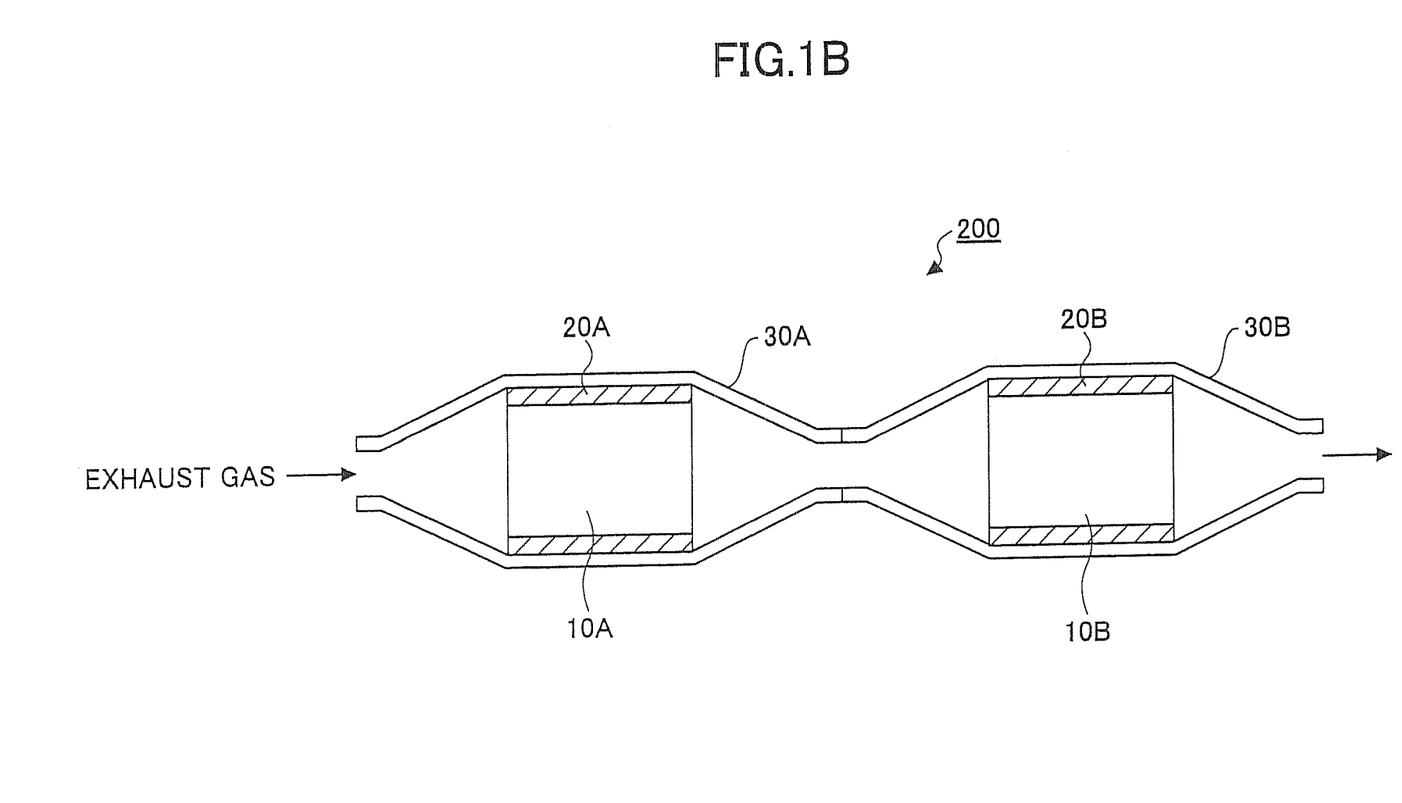

Other example of an exhaust gas treating apparatus according to the embodiment of the present invention is shown in FIG. 1B. In an exhaust gas treating apparatus 200 shown in FIG. 1B, a honeycomb structure 10A is contained in a metal casing 30A while a holding sealing member 20A covers a peripheral surface of the honeycomb structure 10A, a honeycomb structure 10B is contained in a metal casing 30B while a holding sealing member 20B covers a peripheral surface of the honeycomb structure 10B, and the metal casings 30A and 30B are connected by interposing an exhaust pipe (not shown). The other components are the same as those of the exhaust gas treating apparatus 100 shown in FIG. 1A.

Figure 2:
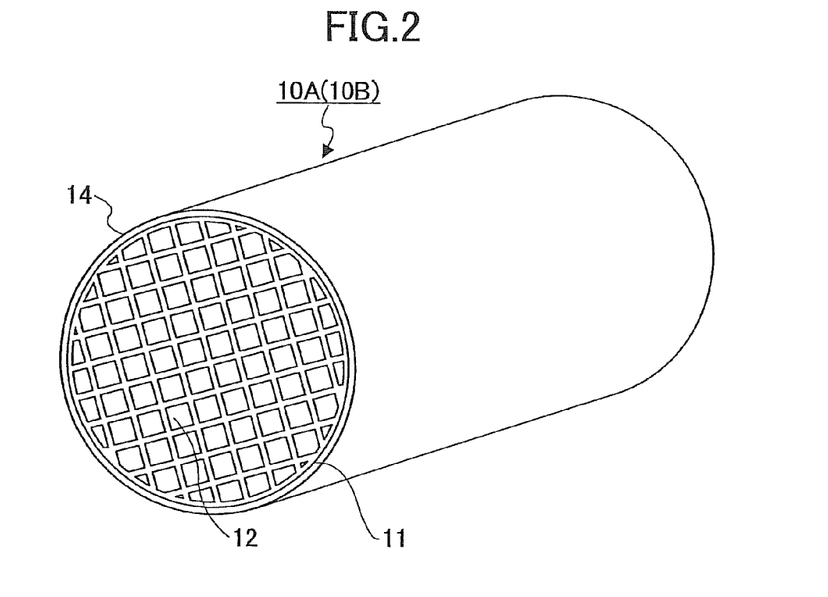

An example of the honeycomb structure 10A (10B) is shown in FIG. 2. The honeycomb structure 10A (10B) is formed by single honeycomb unit 11 whose peripheral surface is covered with a peripheral coating layer 14. The honeycomb unit 11 contains zeolite and an inorganic binder and in which plural through holes 12 separated by walls are formed in parallel in the long length direction of the honeycomb unit 11.

The zeolite contains ion exchanged zeolite to which ion exchange has been applied by using one or more species selected from a group of Cu, Mn, Ag, and V, and/or ion exchanged zeolite to which ion exchange has been applied by using one or more species selected from a group of Fe, Ti, and Co; and can further contain non-ion exchanged zeolite and ion exchanged zeolite to which the ion exchange has been applied by using a metal other than the above metallic species.

At this time, in the ratio of the weight of the ion exchanged zeolite by using one or more species selected from the group of Cu, Mn, Ag, and V to the total weight of the ion exchanged zeolite by using one or more species selected from the group of Cu, Mn, Ag, and V and the ion exchanged zeolite by using one or more species selected from the group of Fe, Ti, and Co, the ratio of the honeycomb structure 10B is greater than the ratio of the honeycomb structure 10A.

In addition, in the ratio of the weight of the ion exchanged zeolite by using one or more species selected from the group of Fe, Ti, and Co to the total weight of the ion exchanged zeolite by using one or more species selected from the group of Cu, Mn, Ag, and V and the ion exchanged zeolite by using one or more species selected from the group of Fe, Ti, and Co; the ratio of the honeycomb structure 10A is greater than the ratio of the honeycomb structure 10B.

When a conventional honeycomb structure containing zeolite to which ion exchange has been applied by using Fe is used in the SCR system, there is a problem that NOx treating efficiency (NOx conversion ratio) likely becomes lower than efficiency to be expected from the contained amount of zeolite in the honeycomb structure. That is, since exhaust gases flow into the honeycomb structure, a temperature difference is likely generated in the long length direction of the honeycomb structure. In other words, in the exhaust gas flowing direction, the temperature becomes relatively low at the downstream side of the honeycomb structure, and it is conceivable that a temperature region is likely formed in which temperature the NOx treating efficiency is insufficient in the ion exchanged zeolite to which ion exchange has been applied by using Fe.

An embodiment of the present invention can provide an exhaust gas treating apparatus which can increase NOx treating efficiency in a wide range of temperature in an SCR system.

The inventors of the present invention have found that high Nox treating efficiency can be obtained in a wide range of temperature; when a honeycomb structure that contains ion exchanged zeolite to which the ion exchange has been applied by using one or more species selected from the group of Cu, Mn, Ag, and V is disposed at the downstream side of an exhaust gas treating apparatus in the exhaust gas flowing direction, and a honeycomb structure that contains ion exchanged zeolite to which the ion exchange has been applied by using one or more species selected from the group of Fe, Ti, and Co is disposed at the upstream side of the exhaust gas treating apparatus in the exhaust gas flowing direction.

It is conceivable that the ion exchanged zeolite to which the ion exchange has been applied by using one or more species selected from the group of Cu, Mn, Ag, and V has higher NOx treating efficiency than the ion exchanged zeolite to which the ion exchange has been applied by using one or more species selected from the group of Fe, Ti, and Co at a low temperature region (for example, approximately 150 to approximately 250° C.).

At this time, in the exhaust gas treating apparatus 100 (200), the temperature of the honeycomb structure 10A is likely to be relatively high and the temperature of the honeycomb structure 10B is likely to be relatively low due to the flow of the exhaust gases. Therefore, the ion exchanged zeolite in the honeycomb unit 11 is likely effectively used for treating NOx. Consequently, it is conceivable that the exhaust gas treating apparatus 100 (200) can likely increase the NOx treating efficiency in a wide range of temperature (for example, approximately 200 to approximately 500° C.).

In the honeycomb structure 10A, it is preferable that the ratio of the weight of the ion exchanged zeolite to which the ion exchange has been applied by using one or more species selected from the group of Fe, Ti, and Co to the total weight of the ion exchanged zeolite to which the ion exchange has been applied by using one or more species selected from the group of Cu, Mn, Ag, and V and the ion exchanged zeolite to which the ion exchange has been applied by using one or more species selected from the group of Fe, Ti, and Co is approximately 0.90 to approximately 1.00. When the ratio of the weight is approximately 0.90 or more, in some cases, the zeolite in the honeycomb structure 10A is likely effectively used for treating NOx.

In the honeycomb structure 10B, it is preferable that the ratio of the weight of the ion exchanged zeolite to which the ion exchange has been applied by using one or more species selected from the group of Cu, Mn, Ag, and V to the total weight of the ion exchanged zeolite to which the ion exchange has been applied by using one or more species selected from the group of Cu, Mn, Ag, and V and the ion exchanged zeolite to which the ion exchange has been applied by using one or more species selected from the group of Fe, Ti, and Co is approximately 0.90 to approximately 1.00. When the ratio of the weight is approximately 0.90 or more, in some cases, the zeolite in the honeycomb structure 10B is likely to effectively used for treating NOx.

In the exhaust gas treating apparatus 100, one or more honeycomb structures whose peripheral surface is covered with a holding sealing member 20 can be further disposed between the honeycomb structures 10A and 10B in the metal casing 30. In addition, in the exhaust gas treating apparatus 200, one or more metal casings containing a honeycomb structure whose peripheral surface is covered with a holding sealing member 20 can be further disposed between the metal casings 30A and 30B by interposing exhaust pipes.

The honeycomb structure to be further disposed in the exhaust gas treating apparatus 100 (200) is not particularly limited. However, the following is preferable. That is, the ratio of the weight of the ion exchanged zeolite to which the ion exchange has been applied by using one or more species selected from the group of Cu, Mn, Ag, and V to the total weight of the ion exchanged zeolite to which the ion exchange has been applied by using one or more species selected from the group of Cu, Mn, Ag, and V and the ion exchanged zeolite to which the ion exchange has been applied by using one or more species selected from the group of Fe, Ti, and Co is larger than the ratio in the honeycomb structure 10A and lower than the ratio of the honeycomb structure 10B. The other components are the same as those in the honeycomb structure 10A (10B).

In addition, when two or more honeycomb structures are further disposed between the honeycomb structures 10A and 10B, the following is preferable. That is, the ratio of the weight of the ion exchanged zeolite to which the ion exchange has been applied by using one or more species selected from the group of Cu, Mn, Ag, and V to the total weight of the ion exchanged zeolite to which the ion exchange has been applied by using one or more species selected from the group of Cu, Mn, Ag, and V and the ion exchanged zeolite to which the ion exchange has been applied by using one or more species selected from the group of Fe, Ti, and Co is larger at the downstream side in the exhaust gas flowing direction.

The amount of zeolite contained per apparent unit volume in the honeycomb unit 11 is preferably approximately 230 to approximately 270 g/L. When the amount of zeolite contained per apparent unit volume in the honeycomb unit 11 is approximately 230 g/L or more, in some cases, the apparent volume of the honeycomb unit 11 is not needed to be great so as to obtain sufficient NOx treating efficiency, and when the amount of zeolite contained per apparent unit volume in the honeycomb unit 11 is approximately 270 g/L or less, the strength of the honeycomb unit 11 is hardly insufficient. The zeolite includes ion exchanged zeolite and non-ion exchanged zeolite.

In the ion exchanged zeolite to which the ion exchange has been applied by using one or more species selected from the group of Cu, Mn, Ag, and V, and the ion exchanged zeolite to which the ion exchange has been applied by using one or more species selected from the group of Fe, Ti, and Co; the ion exchanged amount is preferably approximately 1.0 to approximately 10.0 wt %, respectively, and more preferably, approximately 1.0 to approximately 5.0 wt %. When the ion exchanged amount is approximately 1.0 wt % or more, an ammonia absorption capability by the ion exchange is hardly insufficient; and when the ion exchanged amount is approximately 10.0 wt % or less, the structure of the zeolite hardly become unstable when heat is applied. When the ion exchange is applied to the zeolite, it is sufficient that the zeolite is soaked into an aqueous solution containing cations.

The zeolite is not particularly limited. However, there are β-type zeolite, Y-type zeolite, ferrierite, ZSM-5-type zeolite, mordenite, faujasite, zeolite A, zeolite L, and the like. The above zeolite can be used solely, or two or more above zeolite can be used in combination. As the zeolite, any kind of zeolite can be used.

In addition, in the zeolite, the mole ratio of silica to alumina is preferably approximately 30 to approximately 50. As the zeolite, any kind of zeolite can be used.

The zeolite preferably includes secondary particles, and the average particle diameter of the secondary particles of the zeolite is preferably approximately 0.5 to approximately 10 μm. When the average particle diameter of the secondary particles of the zeolite is approximately 0.5 μm or more, a large amount of an inorganic binder is not needed to be added, and as a result, extrusion molding of the honeycomb unit 11 is likely performed, and when the average particle diameter of the secondary particles of the zeolite is approximately 10 μm or less, the specific surface area of the zeolite is hardly lowered and the NOx treating efficiency is hardly lowered. As the zeolite, any kind of zeolite can be used.

In addition, the honeycomb unit 11 may further contain inorganic particles other than the zeolite particles so as to increase the strength of the honeycomb unit 11. The inorganic particles other than the zeolite particles are not particularly limited. However, as the inorganic particles other than the zeolite particles, there are alumina particles, silica particles, titania particles, zirconia particles, ceria particles, mullite particles, a precursor of these particles, and the like. One kind of the above particles can be used solely, or two or more kinds of the above particles can be used in combination. Of the above particles, in particular, the alumina particles and the zirconia particles are preferably used. As the zeolite, any kind of zeolite can be used.

The average particle diameter of the inorganic particles other than the zeolite particles is preferably approximately 0.5 to approximately 10 μm. When the average particle diameter of the inorganic particles other than the zeolite particles is approximately 0.5 μm or more, a large amount of an inorganic binder is not needed to be added, and as a result, extrusion molding of the honeycomb unit 11 is likely performed, and when the average particle diameter of the inorganic particles other than the zeolite particles is approximately 10 μm or less, an effect to increase the strength of the honeycomb unit 11 hardly becomes insufficient. The inorganic particles other than the zeolite particles can contain secondary particles.

The ratio of the average particle diameter of the secondary particles of the inorganic particles other than the zeolite particles to the average particle diameter of the secondary particles of the zeolite particles is preferably approximately 1 or less, and more preferably, approximately 0.1 to approximately 1. When the ratio is approximately 1.0 or less, an effect to increase the strength of the honeycomb unit 11 hardly becomes insufficient. As the zeolite, any kind of zeolite can be used.

In the honeycomb unit 11, the contained amount of the inorganic particles other than the zeolite particles is preferably approximately 3 to approximately 30 wt %, and more preferably, approximately 5 to approximately 20 wt %. When the contained amount of the inorganic particles other than the zeolite particles is approximately 3 wt % or more, the strength of the honeycomb unit 11 is hardly lowered, and when the contained amount of the inorganic particles other than the zeolite particles is approximately 30 wt % or less, the contained amount of the zeolite particles in the honeycomb unit 11 is hardly lowered, and the NOx treating efficiency is hardly lowered.

The inorganic binder is not particularly limited. However, as the inorganic binder, there is a solids content contained in alumina sol, silica sol, titania sol, liquid glass, meerschaum sol, attapulgite sol, or the like. The inorganic binder can be used solely, or two or more of the above can be used in combination.

In the honeycomb unit 11, the contained amount of the inorganic binder is preferably approximately 5 to approximately 30 wt %, and more preferably, approximately 10 to approximately 20 wt %. When the contained amount of the inorganic binder is approximately 5 wt % or more, the strength of the honeycomb unit 11 is hardly lowered, and when the contained amount of the inorganic binder is approximately 30 wt % or less, molding of the honeycomb unit 11 is hardly difficult.

The honeycomb unit 11 is further preferable to contain inorganic fibers so as to increase the strength of the honeycomb unit 11.

The inorganic fibers are not particularly limited when the strength of the honeycomb unit 11 is increased by the inorganic fibers. As the inorganic fibers, there are alumina fibers, silica fibers, silicon carbide fibers, silica-alumina fibers, glass fibers, potassium titanate fibers, aluminum borate fibers, and the like. One kind of the inorganic fibers can be used solely, or two or more above inorganic fibers can be used in combination.

The aspect ratio of the inorganic fibers is preferably approximately 2 to approximately 1000, more preferably, approximately 5 to approximately 800, and still more preferably, approximately 10 to approximately 500. When the aspect ratio of the inorganic fibers is approximately 2 or more, the effect to increase the strength of the honeycomb unit 11 is hardly lowered. When the aspect ratio of the inorganic fibers is approximately 1000 or less, a clog is hardly generated in a molding die at, for example, extrusion molding for forming the honeycomb unit 11, and the effect to increase the strength of the honeycomb unit 11 is hardly lowered due to a breakage of the inorganic fibers during the molding of the honeycomb unit 11.

The contained amount of the inorganic fibers in the honeycomb unit 11 is preferably approximately 3 to approximately 50 wt %, more preferably, approximately 3 to approximately 30 wt %, and still more preferably, approximately 5 to approximately 20 wt %. When the contained amount of the inorganic fibers in the honeycomb unit 11 is approximately 3 wt % or more, the effect to increase the strength of the honeycomb unit 11 is hardly lowered, and when the contained amount of the inorganic fibers in the honeycomb unit 11 is approximately 50 wt % or less, the contained amount of the zeolite particles in the honeycomb unit 11 is hardly lowered and the NOx treating efficiency is hardly lowered.

The porosity of the honeycomb unit 11 is preferably approximately 25 to approximately 40%. When the porosity is approximately 25% or more, the exhaust gasses likely penetrate into the inside of the walls of the honeycomb unit 11 and the zeolite is likely effectively used for NOx treatment, and when the porosity is approximately 40% or less, the strength of the honeycomb unit 11 is hardly insufficient.

The aperture ratio (opening ratio) of the cross section perpendicular to the long length direction of the honeycomb unit 11 is preferably approximately 50 to approximately 65%. When the aperture ratio is approximately 50% or more, the zeolite is likely effectively used for the NOx treatment, and when the aperture ratio is approximately 65% or less, the strength of the honeycomb unit 11 is hardly insufficient.

The density of the through holes 12 of the cross section perpendicular to the long length direction of the honeycomb unit 11 is preferably approximately 31 to approximately 124 pieces per $cm^2$. When the density of the through holes 12 is approximately 31 pieces per $cm^2$ or more, the exhaust gases likely contact the zeolite and the NOx treating efficiency of the honeycomb unit 11 is hardly lowered, and when the density of through holes 12 is approximately 124 pieces per $cm^2$ or less, a pressure loss of the exhaust gases in the honeycomb structure 10A (10B) is hardly increased.

The thickness of the walls to separate the through holes 12 in the honeycomb unit 11 is preferably approximately 0.10 to approximately 0.50 mm, and more preferably, approximately 0.15 to approximately 0.35 mm. When the thickness of the walls is approximately 0.10 mm or more, the strength of the honeycomb unit 11 is hardly lowered, and when the thickness of the wall is approximately 0.50 mm or less, the exhaust gasses likely penetrate into the inside of the walls and the zeolite is likely effectively used for the NOx treatment.

The thickness of the peripheral coating layer 14 is preferably approximately 0.1 to approximately 2 mm. When the thickness of the peripheral coating layer 14 is approximately 0.1 mm or more, the effect to increase the strength of the honeycomb structure 10A (10B) is hardly insufficient, and when the thickness of the peripheral coating layer 14 is approximately 2 mm or less, the zeolite contained amount per unit volume of the honeycomb structure 10A (10B) is hardly lowered, and the NOx treating efficiency of the honeycomb structure 10A (10B) is hardly lowered.

The shape of the honeycomb structure 10A (10B) is cylindrical; however, the shape of the honeycomb structure 10A (10B) in the embodiment of the present invention is not particularly limited to cylindrical, and can be a substantially square pillar, a substantially cylindroid, and the like.

In addition, the shape of the through hole 12 is a square pillar; however, the shape of the through hole 12 in the embodiment of the present invention is not particularly limited, and can be an approximately triangular pillar, an approximately hexagonal pillar, and the like.

Next, an example of a manufacturing method of the honeycomb structure 10A (10B) is described.

First, a raw material paste containing zeolite particles and an inorganic binder, and further containing inorganic particles other than the zeolite particles, inorganic fibers, and the like, if necessary, is prepared. Then a raw honeycomb molded body having a cylindrical shape, in which plural through holes 12 separated by walls are formed in parallel in the long length direction, is formed of the raw material paste by using extrusion molding or the like. With this, a honeycomb unit 11 of a cylindrical shape having sufficient strength can be formed even if firing temperature is low.

The organic binder is added to the raw material paste as alumina sol, silica sol, titania sol, liquid glass, meerschaum sol, attapulgite sol, or the like. The above sol can be used solely, or tow or more of the above sols can be used in combination.

In addition, an organic binder, a dispersion medium, a molding aid, and the like may be arbitrarily added to the raw material paste, if necessary.

The organic binder is not particularly limited. As the organic binder, there are methylcellulose, carboxymethyl cellulose, hydroxylethyl cellulose, polyethyleneglycole, phenol resin, epoxy resin, and the like. The above organic binder can be used solely, or two or more of the above organic binders can be used in combination. The adding amount of the organic binder is preferably approximately 1 to approximately 10 wt % of the total weight of the zeolite particles, the inorganic particles other than the zeolite particles, the inorganic fibers, and the inorganic binder. As the zeolite particles, any kind of the zeolite particles can be used.

The dispersion medium is not particularly limited. As the dispersion media, there are organic solvents such as water and benzene, alcohol such as methanol, and the like. The dispersion medium can be used solely, or two or more of the above dispersion media can be used in combination.

The molding aid is not particularly limited. As the molding aid, there are ethylene glycol, dextrin, fatty acid, fatty acid soap, polyalcohol, and the like. The above molding aid can be used solely, or two or more of the above molding aids can be used in combination.

When the raw material paste is prepared, it is preferable to be mixed and kneaded. The raw material paste can be mixed by using a mixer, an attritor (grinding mill), or the like, and can be kneaded by a kneader or the like.

Next, the obtained honeycomb molded body is dried by using a drying apparatus such as a microwave drying apparatus, a hot air drying apparatus, a dielectric drying apparatus, a reduced pressure drying apparatus, a vacuum drying apparatus, and a freeze drying apparatus.

The dried honeycomb molded body is degreased. The degreasing conditions are not particularly limited and can be arbitrarily selected depending on the amount and kind of organic substances contained in the honeycomb molded body; however, the honeycomb molded body is preferably degreased at approximately 400° C. for approximately 2 hours.

Next, when the dried and degreased honeycomb molded body is fired, the honeycomb unit 11 having the cylindrical shape is obtained. The firing temperature is preferably approximately 600 to approximately 1200° C., and more preferably approximately 600 to approximately 1000° C. When the firing temperature is approximately 600° C. or more, the sintering likely progresses, and the strength of the honeycomb unit 11 is hardly lowered. When the firing temperature is approximately 1200° C. or less, the sintering is not too progressed and the reactive sites of the zeolite are hardly decreased.

Next, a peripheral coating layer paste is applied onto a peripheral surface of the honeycomb unit 11 having the cylindrical shape. The peripheral coating layer paste is not particularly limited; however, as the peripheral coating layer paste, there are a mixture of an inorganic binder and inorganic particles; a mixture of the inorganic binder and inorganic fibers; a mixture of the inorganic binder, the inorganic particles, and the inorganic fibers; and the like.

The peripheral coating layer paste can further contain an organic binder. The organic binder is not particularly limited; however, as the organic binder, there are polyvinyl alcohol, methylcellulose, ethylcellulose, carboxymethyl cellulose, and the like. The above organic binder can be used solely, or two or more of the above organic binders can be used in combination.

Next, when the honeycomb unit 11 on whose peripheral surface the peripheral coating layer paste has been applied is dried and solidified, the honeycomb structure 10A (10B) having the cylindrical shape can be obtained. At this time, when the peripheral coating layer paste contains an organic binder, a degreasing process is preferably applied to the honeycomb structure 10A (10B). The degreasing conditions can be arbitrarily selected depending on the amount and kind of organic substances; however, the degreasing conditions are preferably at approximately 700° C. for approximately 20 minutes.

Figure 3A:
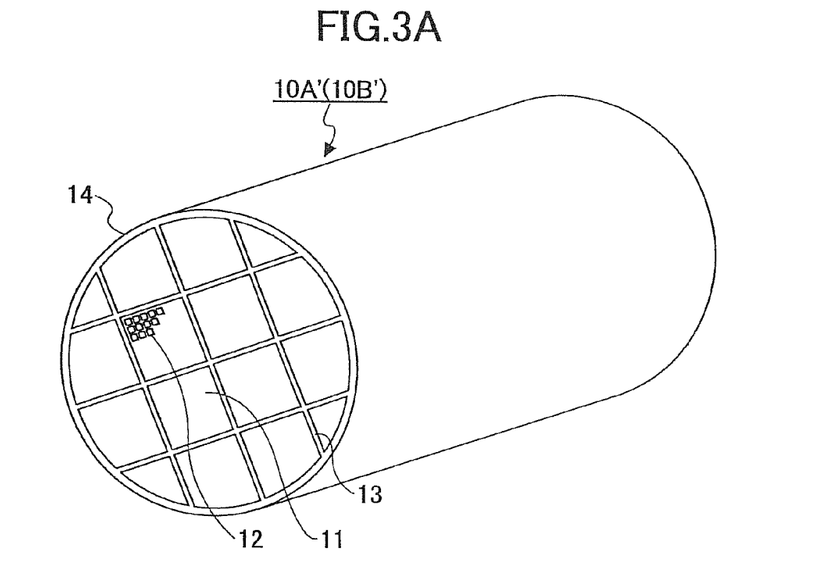
Figure 3B:
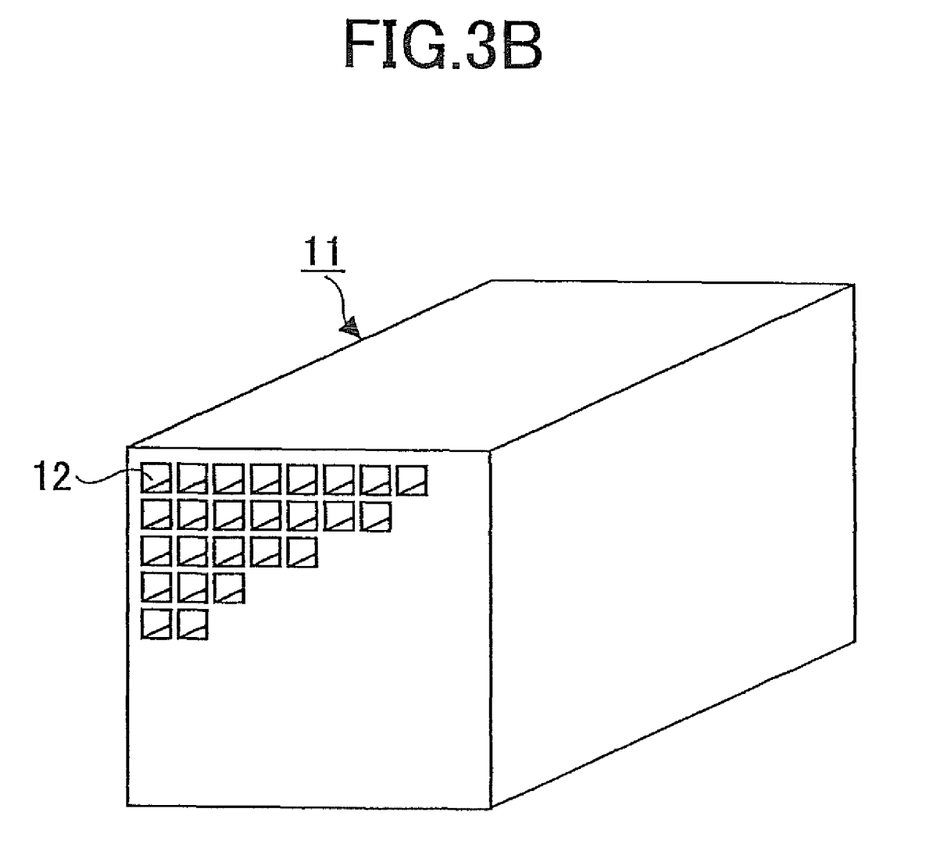

In FIGS. 3A and 3B, a honeycomb structure 10A' (10B') as other example is shown. In the honeycomb structure 10A' (10B'), plural honeycomb units 11, in which plural through holes 12 separated by walls are formed in parallel in the long length direction, are adhered by interposing an adhesive layer 13. The other components are the same as those of the honeycomb structure 10A (10B).

The cross sectional area of the cross section perpendicular to the long length direction of the honeycomb unit 11 shown in FIGS. 3A and 3B is preferably approximately 5 to approximately 50 cm$^2$. When the cross sectional area is approximately 5 cm$^2$ or more, the specific surface area of the honeycomb structure 10A' (10B') is hardly lowered and a pressure loss of exhaust gasses is hardly increased. When the cross sectional area is approximately 50 cm$^2$ or less, the strength against a thermal stress generated in the honeycomb unit 11 hardly becomes insufficient.

The thickness of the adhesive layer 13 which adheres the honeycomb units 11 is preferably approximately 0.5 to approximately 2 mm. When the thickness of the adhesive layer 13 is approximately 0.5 mm or more, the adhesive strength is hardly insufficient. When the thickness of the adhesive layer 13 is approximately 2 mm or less, the specific surface area of the honeycomb structure 10A' (10B') is hardly lowered and the pressure loss of the exhaust gasses is hardly increased.

The honeycomb unit 11 has a square cylindrical shape; however, in the embodiment of the present invention, the shape of the honeycomb unit 11 is not particularly limited. The shape of the honeycomb unit 11 is preferably shaped so as to be easily adhered to another honeycomb unit 11. For example, a substantially hexagonal pillar shape or the like can be used.

Next, an example of a manufacturing method of the honeycomb structure 10A' (10B') is described. First, similar to the honeycomb structure 10A (10B), a honeycomb unit 11 having a square cylindrical shape is formed. Next, an adhesive layer paste is applied onto a peripheral surface of the honeycomb unit 11, and the honeycomb units 11 are sequentially adhered, and the adhered honeycomb units 11 are dried and solidified. With this, an aggregated body of the honeycomb units 11 is formed. At this time, after forming the aggregated body of the honeycomb units 11, a cutting process to form a cylindrical shape can be applied to the aggregated body of the honeycomb units 11, and after this, a polishing process may be applied to the cut aggregated body of the honeycomb units 11. In addition, the aggregated body of the honeycomb units 11 having the cylindrical shape can be formed by adhering honeycomb units whose cross section has a substantially square shape, a substantially fan shape, and the like.

The adhesive layer paste is not particularly limited; however, as the adhesive layer paste, there are a mixture of an inorganic binder and inorganic particles; a mixture of the inorganic binder and inorganic fibers; a mixture of the inorganic binder, the inorganic particles, and the inorganic fibers; and the like.

The adhesive layer paste can further contain an organic binder. The organic binder is not particularly limited; however, as the organic binder, there are polyvinyl alcohol, methylcellulose, ethylcellulose, carboxymethyl cellulose, and the like. The above organic binder can be used solely, or two or more of the above organic binders can be used in combination.

Next, a peripheral coating layer paste is applied onto a peripheral surface of the aggregated body of the honeycomb units 11. The peripheral coating layer paste is not particularly limited, and may contain the same materials as those of the adhesive layer paste, or may contain a different material from that of the adhesive layer paste. In addition, the composition of the peripheral coating layer paste may be the same as that of the adhesive layer paste.

Next, when the aggregated body of the honeycomb units 11 onto which the peripheral coating layer paste has been applied is dried and solidified, the honeycomb structure 10A' (10B') having the cylindrical shape can be obtained. At this time, when the adhesive layer paste and/or the peripheral coating layer paste contains an organic binder, a degreasing process is preferably applied to the honeycomb structure 10A' (10B'). The degreasing conditions can be arbitrarily selected depending on the amount and kind of organic substances; however, the degreasing conditions are preferably at approximately 700° C. for approximately 20 minutes.

In the honeycomb structure 10A' (10B'), it is possible that the peripheral coating layer 14 is formed or is not formed.

EXAMPLES

Example 1

First, 2600 g of ion exchanged β-type zeolite to which ion exchange has been applied by using 3 wt % of Fe (or Cu) in which the average particle diameter is 2 μm, the silica/alumina ratio is 40, and the specific surface area is 110 m²/g; 2600 g of alumina sol whose solids content is 20 wt % as an inorganic binder containing component; 780 g of alumina fibers whose average fiber diameter is 6 μm and average fiber length is 100 μm as inorganic fibers; and 410 g of methylcellulose as an organic binder were mixed and kneaded. With this, a raw material paste A (or B) was obtained. The Fe (or Cu) ion exchange was performed by soaking zeolite particles in a ferric nitrate aqueous solution (or in a copper nitrate aqueous solution). That is, the raw material paste A is used for manufacturing the honeycomb structure 10A and the raw material paste B is used for manufacturing the honeycomb structure 10B.

The ion exchanged amount of the zeolite was obtained by an IPC luminescent analysis with the use of an ICPS-8100 (a product of SHIMADZU). Next, a raw honeycomb molded body having a cylindrical shape was obtained by extrusion molding the raw material paste A (or B).

Next, the raw honeycomb molded body was dried by using a microwave drying apparatus and a hot air drying apparatus and degreased at 400° C. for 2 hours. Then firing was applied to the dried and degreased honeycomb molded body at 700° C. for 2 hours. With this, a honeycomb structure 10A (or 10B) having a cylindrical shape whose diameter was 30 mm and length was 25 mm was formed. In the formed honeycomb structure 10A (or 10B), the aperture ratio of the cross section perpendicular to the long length direction was 65%, the through hole density was 93 pieces per cm², the thickness of the wall was 0.20 mm, the zeolite contained amount per apparent unit volume was 250 g/L, and the porosity was 30%. The through hole density and the thickness of the wall are shown in Table 1 (described below).

The aperture ratio was obtained by calculating the through hole area of a region of a square with 10 cm sides of the honeycomb structure 10A (or 10B) with the use of an optical microscope. In addition, the through hole density was obtained by calculating the number of the through holes of the region of the square with 10 cm sides of the honeycomb structure 10A (or 10B) with the use of an optical microscope. Further, the thickness of the wall was an average value obtained by measuring thicknesses of 5 positions of the wall of the honeycomb structure 10A (or 10B). Furthermore, the porosity was measured by a mercury intrusion method.

Next, the honeycomb structures 10A and 10B on whose peripheral surfaces a holding sealing member (mat) 20 was disposed were contained in a metal casing 30 (shell). With this, an exhaust gas treating apparatus 100 (see FIG. 1A) was manufactured. At this time, the honeycomb structure 10A was disposed at the upstream side and the honeycomb structure 10B was disposed at the downstream side in the exhaust gas flowing direction.

Examples 2 and 3

Similar to Example 1, honeycomb structures 10 and 10B having a cylindrical shape whose diameter was 30 mm and length was 25 mm were manufactured by changing a die structure in an extrusion molding machine. In the obtained honeycomb structure 10A (or 10B), the zeolite contained amount per apparent unit volume was 250 g/L, the porosity was 30%, and the aperture ratio of the cross section perpendicular to the long length direction was 65%. That is, the above values are the same as those in Example 1. However, the through hole density and the thickness of the wall were different from those of Example 1 (see Table 1).

Comparative Example 1

An exhaust gas treating apparatus was manufactured by containing two honeycomb structures 10A on whose peripheral surfaces a holding sealing member (mat) was disposed in a metal casing (shell).

TABLE 1

| | THICKNESS OF WALL | THROUGH HOLE DENSITY | NOx TREATING EFFICIENCY [%] | |
|---|---|---|---|---|
| | [mm] | [pieces/cm²] | 200° C. | 500° C. |
| EXAMPLE 1 | 0.20 | 93 | 71 | 97 |
| EXAMPLE 2 | 0.25 | 62 | 71 | 96 |
| EXAMPLE 3 | 0.30 | 42 | 70 | 96 |
| COMPARATIVE EXAMPLE 1 | 0.25 | 62 | 45 | 98 |

[Measurement of NOx Treating Efficiency]

The emitting amount of NO (nitric monoxide) emitted from each of the exhaust gas treating apparatuses of Example 1 through 3 and Comparative Example 1 was measured while simulation gases of 200° C. and 500° C. were run into the apparatuses at an SV (space velocity) of 35000/hr with the use of MEXA-7100D (a product of HORIBA), and NOx treating efficiency (NOx conversion ratio) shown by the following equation was measured (detection limit is 0.1 ppm).

NOx Treating Efficiency=(NO Flow-in Amount−NO Flow-out Amount)/NO Flow-in Amount×100

The simulation gas is prepared of nitrogen (balance), carbon dioxide (5 volume %), oxygen (14 volume %), nitric monoxide (350 ppm), ammonia (350 ppm), and water (5 volume %). The measured results are shown in Table 1. As shown in Table 1, it is understandable that the NOx treating efficiency of the exhaust gas treating apparatuses of Example 1 through 3 is higher than that of Comparative Example 1 at 200° C.

As described above, the ratio of the weight of the ion exchanged zeolite to which the ion exchange has been applied by using one or more species selected from the group of Cu, Mn, Ag, and V to the total weight of the ion exchanged zeolite to which the ion exchange has been applied by using one or more species selected from the group of Cu, Mn, Ag, and V and the ion exchanged zeolite to which the ion exchange has been applied by using one or more species selected from the group of Fe, Ti, and Co, is greater in the honeycomb structure 10B disposed at the downstream side than in the honeycomb structure 10A disposed at the upstream side in the exhaust gas flowing direction. In addition, the ratio of the weight of the ion exchanged zeolite to which the ion exchange has been applied by using one or more species selected from the group of Fe, Ti, and Co to the total weight of the ion exchanged zeolite to which the ion exchange has been applied by using one or more species selected from the group of Cu, Mn, Ag, and V and the ion exchanged zeolite to which the ion exchange has been applied by using one or more species selected from the group of Fe, Ti, and Co is greater in the honeycomb structure 10A disposed at the upstream side than in the honeycomb structure 10B disposed at the downstream side in the exhaust gas flowing direction. Therefore, it is understandable that the exhaust gas treating apparatus 100 can further increase the NOx treating efficiency.

In the above, the exhaust gas treating apparatus 100 shown in FIG. 1A is mainly described. However, in the exhaust gas treating apparatus 200 shown in FIG. 1B, it is believable that the same effect as that in the exhaust gas treating apparatus 100 shown in FIG. 1A can be performed.

Further, the present invention is not limited to the embodiment, but variations and modifications may be made without departing from the scope of the present invention.

What is claimed is:

1. An exhaust gas treating apparatus comprising:
   a plurality of honeycomb structures comprising an upstream honeycomb structure and a downstream honeycomb structure each provided along an exhaust gas flowing direction of the exhaust gas treating apparatus, each of the plurality of honeycomb structures comprising at least one honeycomb unit, the at least one honeycomb unit having a longitudinal direction and comprising:
      zeolite comprising zeolite ion-exchanged with at least one of Cu, Mn, Ag, and V and zeolite ion-exchanged with at least one of Fe, Ti, and Co;
      an inorganic binder; and
      walls extending along the longitudinal direction to define through holes;
   a first ratio of weight of the zeolite ion-exchanged with at least one of Cu, Mn, Ag, and V to a total weight of the zeolite ion-exchanged with at least one of Cu, Mn, Ag, and V and the zeolite ion-exchanged with at least one of Fe, Ti, and Co, the first ratio in the downstream honeycomb structure being greater than the first ratio in the upstream honeycomb structure; and
   a second ratio of weight of the zeolite ion-exchanged with at least one of Fe, Ti, and Co to the total weight of the zeolite ion-exchanged with at least one of Cu, Mn, Ag, and V and the zeolite ion-exchanged with at least one of Fe, Ti, and Co, the second ratio in the upstream honeycomb structure being greater than the second ratio in the downstream honeycomb structure.

2. The exhaust gas treating apparatus as claimed in claim 1, wherein the first ratio in the downstream honeycomb structure is from approximately 0.90 to approximately 1.00.

3. The exhaust gas treating apparatus as claimed in claim 1, wherein the second ratio in the upstream honeycomb structure is from approximately 0.90 to approximately 1.00.

4. The exhaust gas treating apparatus as claimed in claim 1, wherein an amount of zeolite per apparent unit volume contained in the at least one honeycomb unit is from approximately 230 g/L to approximately 270 g/L.

5. The exhaust gas treating apparatus as claimed in claim 1, wherein the zeolite comprises at least one of β-type zeolite, Y-type zeolite, ferrierite, ZSM-5-type zeolite, mordenite, faujasite, zeolite A, and zeolite L.

6. The exhaust gas treating apparatus as claimed in claim 1, wherein a mole ratio of silica to alumina in the zeolite is from approximately 30 to approximately 50.

7. The exhaust gas treating apparatus as claimed in claim 1, wherein the zeolite comprises secondary particles having an average particle diameter from approximately 0.5 μm to approximately 10 μm.

8. The exhaust gas treating apparatus as claimed in claim 1, wherein the at least one honeycomb unit further comprises inorganic particles other than the zeolite.

9. The exhaust gas treating apparatus as claimed in claim 8, wherein the inorganic particles other than the zeolite comprise at least one of alumina, silica, titania, zirconia, ceria, mullite, and a precursor of these particles.

10. The exhaust gas treating apparatus as claimed in claim 8, wherein an average particle diameter of the inorganic particles other than the zeolite is from approximately 0.5 μm to approximately 10 μm.

11. The exhaust gas treating apparatus as claimed in claim 8, wherein a ratio of an average particle diameter of secondary particles of the inorganic particles other than the zeolite to an average particle diameter of secondary particles of the zeolite particles is approximately 1 or less.

12. The exhaust gas treating apparatus as claimed in claim 8, wherein an amount of the inorganic particles other than the zeolite contained in the at least one honeycomb unit is from approximately 3 wt % to approximately 30 wt %.

13. The exhaust gas treating apparatus as claimed in claim 1, wherein the inorganic binder comprises a solid content contained in at least one of alumina sol, silica sol, titania sol, liquid glass, meerschaum sol, and attapulgite sol.

14. The exhaust gas treating apparatus as claimed in claim 1, wherein the at least one honeycomb unit further comprises inorganic fibers.

15. The exhaust gas treating apparatus as claimed in claim 14, wherein the inorganic fibers comprise at least one of alumina fibers, silica fibers, silicon carbide fibers, silica-alumina fibers, glass fibers, potassium titanate fibers, and aluminum borate fibers.

16. The exhaust gas treating apparatus as claimed in claim 14, wherein an aspect ratio of the inorganic fibers is from approximately 2 to approximately 1000.

17. The exhaust gas treating apparatus as claimed in claim 14, wherein an amount of the inorganic fibers contained in the at least one honeycomb unit is from approximately 3 wt % to approximately 50 wt %.

18. The exhaust gas treating apparatus as claimed in claim 1, wherein a porosity of the at least one honeycomb unit is from approximately 25% to approximately 40%.

19. The exhaust gas treating apparatus as claimed in claim 1, wherein an aperture ratio in a cross section perpendicular to the longitudinal direction of the at least one honeycomb unit is from approximately 50% to approximately 65%.

20. The exhaust gas treating apparatus as claimed in claim 1, wherein the at least one honeycomb unit comprises plural honeycomb units adhered together by interposing an adhesive layer.

21. The exhaust gas treating apparatus as claimed in claim 20, wherein a cross sectional area in a cross section perpendicular to the longitudinal direction of the at least one honeycomb unit is from approximately 5 $cm^2$ to approximately 50 $cm^2$.

22. The exhaust gas treating apparatus as claimed in claim 20, wherein the plural honeycomb units adhered together have been cut to produce each honeycomb structure.

23. The exhaust gas treating apparatus as claimed in claim 20, wherein the plural honeycomb units comprises a honeycomb unit having a substantially fan shape or a substantially square shape in a cross section perpendicular to the longitudinal direction.

24. The exhaust gas treating apparatus as claimed in claim 1, further comprising:
   a metal casing which houses the plurality of honeycomb structures; and
   a holding sealing member via which the plurality of honeycomb structures are housed in the metal casing so as to cover peripheral surfaces of the plurality of honeycomb structures.

25. The exhaust gas treating apparatus as claimed in claim 1, further comprising:
   metal casings each housing at least one honeycomb structure;
   an exhaust pipe connected to at least one of the metal casings; and holding sealing members via each of which the at least one honeycomb structure is housed in each metal casing so as to cover a peripheral surface of the at least one honeycomb structure.

26. The exhaust gas treating apparatus as claimed in claim 1, wherein at least one honeycomb structure comprises a single honeycomb unit.

27. The exhaust gas treating apparatus as claimed in claim 1, further comprising:
a peripheral coating layer provided on a peripheral surface of at least one honeycomb structure.

28. The exhaust gas treating apparatus as claimed in claim 1, wherein each of the zeolite ion-exchanged with at least one of Cu, Mn, Ag, and V and the zeolite ion-exchanged with at least one of Fe, Ti, and Co has an ion-exchanged amount from approximately 1.0 wt % to approximately 10.0 wt %.

29. The exhaust gas treating apparatus as claimed in claim 1, wherein an amount of the inorganic binder contained in the at least one honeycomb unit is from approximately 5 wt % to approximately 30 wt %.

30. The exhaust gas treating apparatus as claimed in claim 1, wherein a density of the through holes in a cross section perpendicular to the longitudinal direction of the at least one honeycomb unit is from approximately 31 to approximately 124 pieces per $cm^2$.

31. The exhaust gas treating apparatus as claimed in claim 1, wherein each of the walls has a thickness from approximately 0.10 mm to approximately 0.50 mm.

32. The exhaust gas treating apparatus as claimed in claim 1, wherein the at least one honeycomb unit is produced by being fired at a firing temperature from approximately 600° C. to approximately 1200° C.

33. The exhaust gas treating apparatus as claimed in claim 1, wherein the exhaust gas treating apparatus is so constructed to be used in a SCR system.

* * * * *